No. 841,191. PATENTED JAN. 15, 1907.
A. M. SKINNER.
BREAD TOASTER.
APPLICATION FILED APR. 15, 1905.
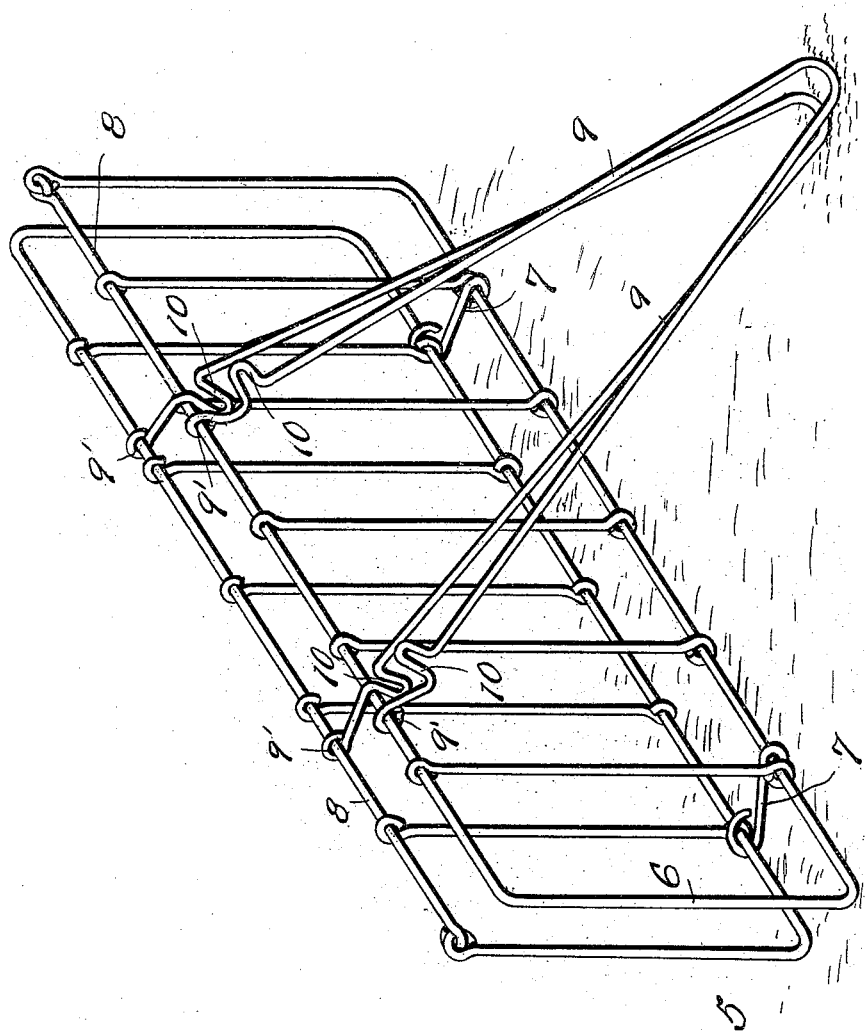
Witnesses:
E. M. Skinner
Laura Skinner
Inventor:
Anna M. Skinner

UNITED STATES PATENT OFFICE.

ANNA M. SKINNER, OF GREELEY, COLORADO.

BREAD-TOASTER.

No. 841,191.  Specification of Letters Patent.  Patented Jan. 15, 1907.

Application filed April 15, 1905. Serial No. 255,842.

*To all whom it may concern:*

Be it known that I, ANNA M. SKINNER, of the city of Greeley, county of Weld, State of Colorado, have invented a new and Improved Bread-Toaster, of which the following is a specification.

This invention relates to cooking utensils, and more particularly to toasters, and has for its object to provide a toaster which will include hinged portions and a handle to each portion, the handle of each portion being formed for engagement of the other portion to hold said portion in coöperative relation.

Another object is to provide a toaster in which the handle will act as a support therefor to hold it in position to receive heat from an open fire.

Other objects and advantages will be apparent from the following description.

In the drawing forming a portion of this specification there is shown a perspective view of the present toaster.

Referring now to the drawing, the present invention comprises two rectangular grated members 5 and 6, which are pivotally connected at their edges by means of links 7 for movement into and out of coöperative relation to hold bread or other food to be toasted. Each of the members 5 and 6 includes the top rod 8, and to each of these top rods there is pivoted a handle 9, these handles consisting of metallic rods bent into V shape, as shown, and having their ends bent to form eyes 9', which encircle the top rod 8. The handles thus include spaced legs, the eyes 9' being located at the disconnected ends thereof, and adjacent to these eyes the legs are bent to form loops 10, which extend in the same direction, the loops of the handle of the member 5 being arranged for engagement with the top rod 8 of the member 7 to hold the two members in coöperative relation, as shown. The loops of the handle of the member 6 are arranged for similar engagement of the top rod of the member 5, and the arrangement is such that when the handle of the member 5 is moved into position to extend over and beyond the member 6 its loops 10 engage the top rod of this member and the handle extends downwardly over engagement of its outer portion with the surface upon which the toaster rests, and the handle of the member 6 also extends downwardly to support the toaster.

It will be seen that the positions of the handles may be shifted to bring them at the opposite side of the toaster, when the loops of that handle which is carried by the member 6 will engage the top rod of the member 5, as mentioned above.

What is claimed is—

1. A toaster comprising two members, a hinge connection for one edge of each of said members, a handle pivoted to the free edge of each of said members, a projection on each of said handles, the projection on either of said handles engaging the edge of the opposite member when folded thereover.

2. A toaster comprising two pivotally-connected members, handles pivoted to the free edges of said members, a projection on each of said handles, said projection on either of said handles, adapted to engage the opposite member, to lock the members together and to support the toaster at an angle to the handles.

3. A toaster comprising a pair of vertical members arranged for the reception of food to be toasted therebetween, links connecting the members at their lower portions for movement of the members out of coöperative relation, a handle including spaced legs connected at the ends of its legs with one of the members for pivotal movement with respect thereto, and extending over and downwardly beyond the other member, said handle having its legs bent to form downwardly-extending loops engaged over the other member, and a similar handle pivotally connected at the ends of its legs with the second-named member, the legs of said second handle being bent to form upwardly-extending loops and being movable to engage said loops with the first-named member to hold the members in coöperative relation.

ANNA M. SKINNER.

Witnesses:
 EDWARD M. SKINNER,
 ARTHUR M. McCLENAHAN.